United States Patent
Kogo et al.

(10) Patent No.: US 8,201,406 B2
(45) Date of Patent: Jun. 19, 2012

(54) CONTROL APPARATUS FOR INTERNAL COMBUSTION ENGINE

(75) Inventors: Tomoyuki Kogo, Gotenba (JP);
Terutoshi Tomoda, Mishima (JP);
Shinobu Ishiyama, Numazu (JP);
Tomoyuki Ono, Sunto-gun (JP);
Koichiro Nakatani, Mishima (JP);
Katsuhiro Ito, Mishima (JP);
Masayoshi Nakagawa, Gotenba (JP);
Yoshihiro Hisataka, Fujinomiya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 183 days.

(21) Appl. No.: 12/678,876

(22) PCT Filed: Oct. 31, 2008

(86) PCT No.: PCT/JP2008/069907
§ 371 (c)(1),
(2), (4) Date: Mar. 18, 2010

(87) PCT Pub. No.: WO2009/060799
PCT Pub. Date: May 14, 2009

(65) Prior Publication Data
US 2010/0263638 A1    Oct. 21, 2010

(30) Foreign Application Priority Data
Nov. 6, 2007 (JP) .................................. 2007-288461

(51) Int. Cl.
*F02B 33/44* (2006.01)
*F02D 23/00* (2006.01)
*F02B 33/00* (2006.01)
*F01L 1/34* (2006.01)

(52) U.S. Cl. .............. 60/612; 60/611; 60/602; 123/561; 123/562; 123/90.17; 123/90.15

(58) Field of Classification Search .................. 60/612, 60/611, 602; 123/561–562, 90.15, 90.17
See application file for complete search history.

(56) References Cited

U.S. PATENT DOCUMENTS
4,691,521 A * 9/1987 Hirabayashi et al. ........... 60/602
(Continued)

FOREIGN PATENT DOCUMENTS
DE      43 32 616 A1    3/1994
(Continued)

OTHER PUBLICATIONS
International Preliminary Report on Patentability issued in International Application No. PCT/JP2008/069907 on Jun. 29, 2010.
(Continued)

*Primary Examiner* — Thai Ba Trieu
(74) *Attorney, Agent, or Firm* — Oliff & Berridge, PLC (57) ABSTRACT

An internal combustion engine control apparatus that prevents an abrupt change in the air amount at the time of supercharger switching. The control apparatus enters a small turbo operating state in which a small turbocharger is mainly operative, during relatively low-rotation-speed and low-load side, and enters a large turbo operating state in which a large turbocharger is mainly operative, in a relatively high-rotation-speed and high-load. In the small turbo operating state, the control apparatus can exercise charging efficiency enhancement control by using a scavenging effect. Before switching from the small turbo operating state to the large turbo operating state, the control apparatus predicts whether the large turbocharger will build up its boost pressure quickly or slowly. When slow boost pressure is predicted, the control apparatus exercises charging efficiency enhancement control to provide a low degree of charging efficiency enhancement.

16 Claims, 5 Drawing Sheets

U.S. PATENT DOCUMENTS

| | | | |
|---|---|---|---|
| 4,996,996 A * | 3/1991 | Hirsh | 132/160 |
| 5,417,068 A * | 5/1995 | Olofsson | 60/605.1 |
| 5,427,078 A | 6/1995 | Hitomi et al. | |
| 6,574,961 B2 * | 6/2003 | Shiraishi et al. | 60/602 |
| 6,626,164 B2 * | 9/2003 | Hitomi et al. | 123/679 |
| 6,745,743 B2 * | 6/2004 | Abo et al. | 123/295 |
| 7,275,516 B1 * | 10/2007 | Cunningham et al. | 123/305 |
| 7,415,966 B2 * | 8/2008 | Irisawa | 123/431 |
| 7,621,256 B2 * | 11/2009 | Cunningham et al. | 123/305 |
| 7,644,586 B2 * | 1/2010 | Yamagata | 60/612 |
| 7,735,320 B2 * | 6/2010 | Yanakiev | 60/602 |
| 7,762,068 B2 * | 7/2010 | Tabata et al. | 60/608 |
| 7,779,796 B2 * | 8/2010 | Nakamura | 123/90.15 |
| 7,921,944 B2 * | 4/2011 | Russell et al. | 123/559.1 |
| 8,086,385 B2 * | 12/2011 | Ogawa et al. | 123/90.17 |
| 2003/0121495 A1 * | 7/2003 | Abo et al. | 123/295 |
| 2007/0151243 A1 | 7/2007 | Stewart | |
| 2007/0256666 A1 * | 11/2007 | Cunningham et al. | 123/445 |
| 2010/0242899 A1 * | 9/2010 | Hitomi et al. | 123/299 |
| 2010/0242900 A1 * | 9/2010 | Hitomi et al. | 123/299 |
| 2010/0312451 A1 * | 12/2010 | Karnik et al. | 123/90.15 |
| 2011/0000470 A1 * | 1/2011 | Roth | 123/90.15 |
| 2011/0067679 A1 * | 3/2011 | Hitomi et al. | 123/564 |
| 2011/0219767 A1 * | 9/2011 | Miyashita | 60/600 |
| 2011/0253116 A1 * | 10/2011 | Eiraku | 123/676 |
| 2011/0302917 A1 * | 12/2011 | Styles et al. | 60/602 |

FOREIGN PATENT DOCUMENTS

| | | | |
|---|---|---|---|
| JP | A-10-176558 | | 6/1998 |
| JP | A-11-82074 | | 3/1999 |
| JP | A-11-141375 | | 5/1999 |
| JP | A-11-324746 | | 11/1999 |
| JP | A-2000-73776 | | 3/2000 |
| JP | A-2003-65058 | | 3/2003 |
| JP | A-2004-190514 | | 7/2004 |
| JP | A-2005-83285 | | 3/2005 |
| JP | A-2006-132410 | | 5/2006 |
| JP | 2007046487 A | * | 2/2007 |
| JP | A-2007-154684 | | 6/2007 |
| JP | 2007182828 A | * | 7/2007 |
| JP | 2008069660 A | * | 3/2008 |
| JP | 2008297929 A | * | 12/2008 |
| WO | WO 2005/035958 A1 | | 4/2005 |

OTHER PUBLICATIONS

International Search Report for International Application No. PCT/JP2008/069907, issued Dec. 9, 2008.

U.S. Appl. No. 12/674,330, filed Feb. 19, 2010 in the name of Takashi Ogawa.

European Search Report dated Mar. 21, 2012 for corresponding European Patent Application No. 08847559.5.

* cited by examiner

CONTROL APPARATUS FOR INTERNAL COMBUSTION ENGINE

TECHNICAL FIELD

The present invention relates to a control apparatus for an internal combustion engine.

BACKGROUND ART

Disclosed in JP-A-2007-154684 is a two-stage supercharged vehicle engine for which a high-pressure stage turbocharger and a low-pressure stage turbocharger are arranged in series. In general, a compressor used with a turbocharger has such characteristics that its efficiency varies with an air (volume) flow rate and a pressure ratio. The characteristics are expressed in the form of a so-called compressor map. A two-stage supercharged engine can use its exhaust energy more effectively by using a small-capacity compressor exhibiting high-efficiency at a low flow late for the high-pressure stage turbocharger and using a large-capacity compressor exhibiting high-efficiency at a high flow rate for the low-pressure stage turbocharger. In other words, while the engine is conducting a low-speed, low-load operation, the high-pressure stage turbocharger exhibiting high efficiency at a low flow rate is operated with the low-pressure stage turbocharger substantially stopped because an intake air amount is small. On the other hand, while the engine is conducting a high-speed, high-load operation, an intake air amount adequate for an increase in engine power is obtained by operating only the low-pressure stage turbocharger having a large capacity in such a manner as to let an engine exhaust gas bypass a high-pressure stage turbine of the high-pressure stage turbocharger. A high boost pressure can be obtained over a wide operating range by selectively using either the high-pressure stage turbocharger or low-pressure stage turbocharger in accordance with engine speed and load as described above.

Patent Document 1: JP-A-2007-154684
Patent Document 2: JP-A-2005-83285
Patent Document 3: JP-A-1998-176558
Patent Document 4: JP-A-1999-324746

DISCLOSURE OF THE INVENTION

Problem to be Solved by the Invention

However, the above-described two-stage supercharged engine is likely to cause an abrupt change in the boot pressure (air amount) when switching from the high-pressure stage turbocharger to the low-pressure stage turbocharger. Such an abrupt boost pressure change is likely to cause an abrupt torque change. When an abrupt torque change occurs, degraded drivability results because a vehicle driver feels an acceleration shock or acceleration delay.

The present invention has been made to address the above problem. It is an object of the present invention to provide an internal combustion engine control apparatus that is capable of preventing an abrupt change in the air amount at the time of supercharger switching.

Means for Solving the Problem

First aspect of the present invention is a control apparatus for an internal combustion engine comprising:
a supercharger;
supercharger switching means for switching the supercharger between a supercharger nonoperating state and a supercharger operating state, the nonoperating state making the supercharger substantially inoperative when an operating point of the internal combustion engine is within a low-rotation-speed and low-load region, the operating state making the supercharger operative when the operating point is within a high-rotation-speed and high-load region;

charging efficiency enhancement means for exercising charging efficiency enhancement control in the supercharger nonoperating state, wherein a valve overlap period is provided during which an intake valve open period and an exhaust valve open period overlap and a trough of exhaust pressure pulsation is adjusted to be present within the valve overlap period;

boost pressure prediction means for preliminarily predicting, before switching from the supercharger nonoperating state to the supercharger operating state, whether the supercharger will build up boost pressure quickly or slowly; and degree-of-charging-efficiency-enhancement control means which, when the boost pressure is predicted to build up slowly, causes the charging efficiency enhancement means to provide a lower degree of charging efficiency enhancement than when the boost pressure is predicted to build up quickly.

Second aspect of the present invention is a control apparatus for an internal combustion engine comprising:
a small supercharger;
a large supercharger having a larger capacity than the small supercharger;
supercharger switching means for switching these superchargers between a small supercharger operating state and a large supercharger operating state, the small supercharger operating state making the small supercharger mainly operative when an operating point of the internal combustion engine is within a low-rotation-speed and low-load region, the large supercharger operating state making the large supercharger mainly operative when the operating point is within a high-rotation-speed and high-load region;

charging efficiency enhancement means for exercising charging efficiency enhancement control in the small supercharger operating state, wherein a valve overlap period is provided during which an intake valve open period and an exhaust valve open period overlap and a trough of exhaust pressure pulsation is adjusted to be present within the valve overlap period;

boost pressure prediction means for preliminarily predicting, before switching from the small supercharger operating state to the large supercharger operating state, whether the large supercharger will build up boost pressure quickly or slowly; and degree-of-charging-efficiency-enhancement control means which, when the boost pressure is predicted to build up slowly, causes the charging efficiency enhancement means to provide a lower degree of charging efficiency enhancement than when the boost pressure is predicted to build up quickly.

Third aspect of the present invention is the control apparatus for an internal combustion engine according to the second aspect, wherein the large supercharger includes a turbine which operates on exhaust gas, and a variable nozzle which varies the inlet area of the turbine, and wherein the boost pressure prediction means predicts, based on the opening of the variable nozzle, whether the boost pressure will build up quickly or slowly.

Fourth aspect of the present invention is the control apparatus for an internal combustion engine according to the second or the third aspect, further comprising detection means for detecting the boost pressure or the rotation speed of the large supercharger, wherein the boost pressure prediction means predicts, based on the detected boost pressure or rotation speed, whether the boost pressure will build up quickly or slowly.

Fifth aspect of the present invention is the control apparatus for an internal combustion engine according to any one of the first to the fourth aspects, further comprising degree-of-warm-up detection means for detecting the degree of warm-up of the internal combustion engine, wherein the boost pressure prediction means predicts, based on the degree of warm-up, whether the boost pressure will build up quickly or slowly.

Sixth aspect of the present invention is the control apparatus for an internal combustion engine according to any one of the first to the fifth aspects, further comprising switching point correction means which, when the degree of charging efficiency enhancement is high, set a switching point of the supercharger switching means on a higher-rotation-speed and higher-load side than when the degree of charging efficiency enhancement is low.

Advantages of the Invention

When it is predicted before switching from the supercharger nonoperating state to the supercharger operating state that the boost pressure rise (increase gradient) by the supercharger will be gradual, the first aspect of the present invention can exercise charging efficiency enhancement control to decrease the degree of charging efficiency enhancement. This makes it possible to avoid a decrease in the air amount (boost pressure) at the time of switching to the supercharger operating state, thereby surely preventing an abrupt torque change. When, on the other hand, it is predicted that the boost pressure rise by the supercharger will be sharp, the first aspect of the present invention can increase the degree of charging efficiency enhancement to prevent a temporary suspension of an air amount increase at the time of switching and a sharp air amount increase after switching. This makes it possible to avoid an acceleration delay and torque shock. The above means that good acceleration can be achieved no matter whether the boost pressure rise after switching to the supercharger operating state is sharp or gradual.

When it is predicted before switching from the small supercharger operating state to the large supercharger operating state that the boost pressure rise (increase gradient) by the large supercharger will be gradual, the second aspect of the present invention can exercise charging efficiency enhancement control to decrease the degree of charging efficiency enhancement. This makes it possible to avoid a decrease in the air amount (boost pressure) at the time of switching to the large supercharger operating state, thereby surely preventing an abrupt torque change. When, on the other hand, it is predicted that the boost pressure rise by the large supercharger will be sharp, the second aspect of the present invention can increase the degree of charging efficiency enhancement to prevent a temporary suspension of an air amount increase at the time of switching and a sharp air amount increase after switching. This makes it possible to avoid an acceleration delay and torque shock. The above means that good acceleration can be achieved no matter whether the boost pressure rise after switching to the large supercharger operating state is sharp or gradual.

The third aspect of the present invention makes it possible to accurately predict, based on the opening of the variable nozzle for the large supercharger (turbocharger), whether the boost pressure rise by the large supercharger will be sharp or gradual.

The fourth aspect of the present invention detects the boost pressure or the rotation speed of the large supercharger, thereby making it possible to accurately predict whether the boost pressure rise by the large supercharger will be sharp or gradual.

The fifth aspect of the present invention makes it possible to accurately predict, based on the degree of internal combustion engine warm-up, whether the boost pressure rise by the large supercharger will be sharp or gradual.

When the degree of charging efficiency enhancement is high, the sixth aspect of the present invention sets the supercharger switching point on a higher-rotation-speed and higher-load side than when the degree of charging efficiency enhancement is low. Therefore, an appropriate supercharger switching point can be set in accordance with the degree of charging efficiency enhancement. This makes it possible to surely prevent an abrupt change in the air amount at the time of supercharger switching.

DESCRIPTION OF REFERENCE NUMERALS 10 diesel engine
12 exhaust manifold
14, 17, 26 exhaust path
16 small turbocharger
16a turbine
16b compressor
18 large turbocharger
18a turbine
18b compressor
18c variable nozzle
20 small turbine bypass path
22 open/close valve
24 actuator
25 large turbo rotation speed sensor
28 exhaust filter
32 intake path
34 air cleaner
36 intercooler
38 intake manifold
39 boost pressure sensor
50 ECU
52 intake valve
54 intake VVT mechanism
56 exhaust valve
58 exhaust VVT mechanism

BEST MODE FOR CARRYING OUT THE INVENTION

An embodiment of the present invention will now be described with reference to the accompanying drawings. Like elements in the drawings are identified by the same reference numerals and will not be redundantly described.

First Embodiment

Description of System Configuration

Figure 1:
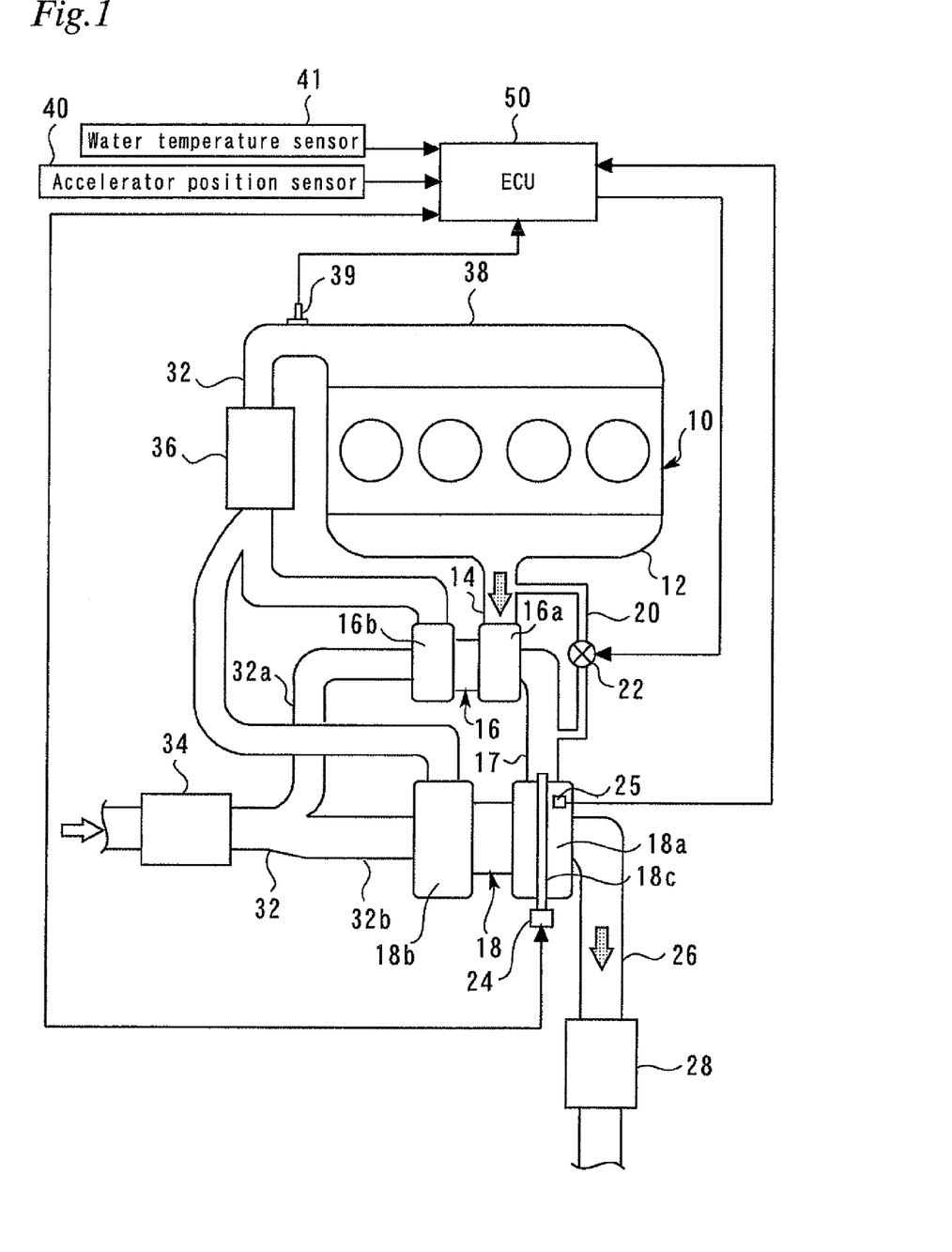
FIG. 1 shows the configuration of a system according to a first embodiment of the present invention.

FIG. 1 is a diagram illustrating the configuration of a system according to a first embodiment of the present invention. The system shown in FIG. 1 includes a four-cycle diesel engine 10. It is assumed that the diesel engine 10 is mounted in a vehicle and used as its motive power source. Exhaust gas discharged from each cylinder of the diesel engine 10 is gathered by an exhaust manifold 12 and flows into an exhaust path 14. The diesel engine 10 according to the present embodiment is an in-line four-cylinder engine. However, the number of cylinders and the arrangement of the cylinders in the diesel engine of the present invention are not specifically defined.

The diesel engine 10 according to the present embodiment includes a small turbocharger 16 and a large turbocharger 18 which has a larger capacity than the small turbocharger 16 and is suitable for use at a high flow rate. As described later, the diesel engine 10 uses the small turbocharger 16 when its operating point is a relatively low-rotation-speed and low-load side, and uses the large turbocharger 18 when its operating point is a relatively high-rotation-speed and high-load side.

A turbine 18a for the large turbocharger 18 is positioned downstream of a turbine 16a for the small turbocharger 16. In other words, the exhaust path 14 directly below the exhaust manifold 12 is connected to an inlet of the turbine 16a for the small turbocharger 16. Further, an exhaust path 17 extended out of an outlet of the turbine 16a for the small turbocharger 16 is connected to an inlet of the turbine 18a for the large turbocharger 18.

The exhaust path 14 positioned upstream of the turbine 16a for the small turbocharger 16 and the exhaust path 17 positioned downstream of the turbine 16a for the small turbocharger 16 are connected by a small turbine bypass path 20. An open/close valve 22 is installed in the middle of the small turbine bypass path 20 to open or close this path 20.

The large turbocharger 18 includes a variable nozzle 18c which varies the inlet area of the turbine 18a. The variable nozzle 18c is driven by an actuator 24 to open and close. When the variable nozzle 18c closes, the exhaust gas flowing into the turbine 18a increases its flow velocity, thereby increasing the rotation speed of the large turbocharger 18. A large turbo rotation speed sensor 25 which detects the rotation speed of the large turbocharger 18 is installed on the large turbocharger 18.

In the middle of an exhaust path 26 positioned downstream of the turbine 18a for the large turbocharger 18, an exhaust filter 28 is installed to capture particulate matter (PM) in exhaust gas. An exhaust purification catalyst may be installed upstream or downstream of the exhaust filter 28 although it is not shown in the figure. Alternatively, a catalytic component may be supported by the exhaust filter 28.

An air cleaner 34 is disposed near an inlet of an intake path 32 of the diesel engine 10. Downstream of the air cleaner 34, the intake path 32 branches into a first path 32a and a second path 32b. A compressor 16b for the small turbocharger 16 is installed in the middle of the first path 32a, whereas a compressor 18b for the large turbocharger 18 is installed in the middle of the second path 32b. Downstream of the compressors 16b, 18b, the first path 32a and the second path 32b converge and connect to an intercooler 36. The intake path 32 positioned downstream of the intercooler 36 is connected to an intake manifold 38. A boost pressure sensor 39 which detects the boost pressure is installed in the intake path 32 positioned downstream of the intercooler 36.

Air taken in through the air cleaner 34 is compressed by the compressor 16b for the small turbocharger 16 or by the compressor 18b for the large turbocharger 18, is cooled by the intercooler 36, and flows into each cylinder through the intake manifold 38.

The system according to the present embodiment also includes an ECU (Electronic Control Unit) 50. The ECU 50 is electrically connected not only to the aforementioned large turbo rotation speed sensor 25 and boost pressure sensor 39 but also to various other sensors such as an accelerator position sensor 40 for detecting the amount of accelerator pedal depression (accelerator opening) of the vehicle in which the diesel engine 10 is mounted, and a water temperature sensor 41 for detecting the cooling water temperature of the diesel engine 10. The ECU 50 is also electrically connected to various actuators such as the aforementioned open/close valve 22 and actuator 24. In accordance with an output from each sensor and with a predetermined program, the ECU 50 operates various actuators to control the operating status of the diesel engine 10.

Figure 2:
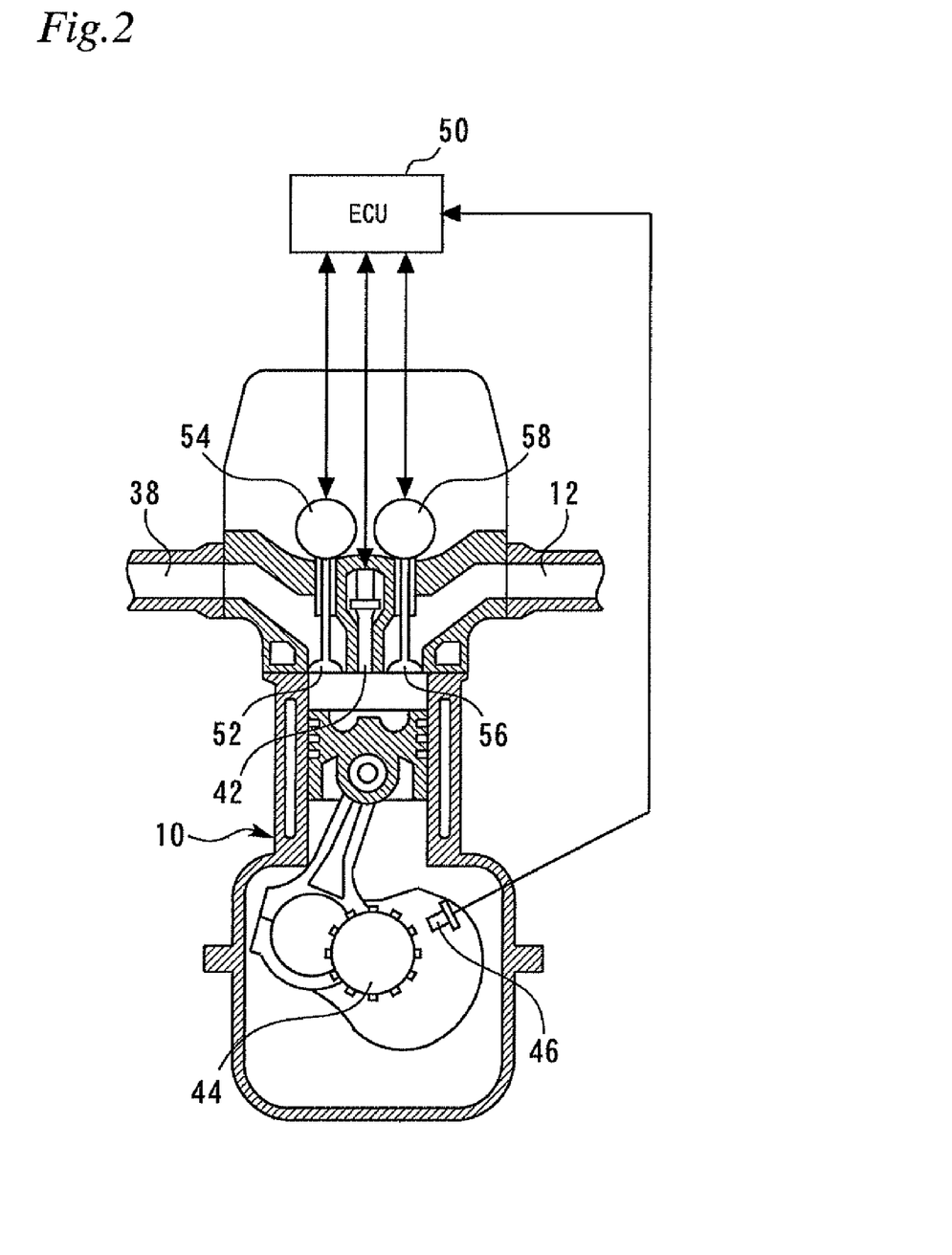
FIG. 2 is a drawing which shows cross section of a cylinder of a diesel engine in the system according to the first embodiment of the present invention.

FIG. 2 is a cross-sectional view of a cylinder of the diesel engine 10 in the system shown in FIG. 1. The diesel engine 10 according to the present embodiment will now be further described. Each cylinder of the diesel engine 10 is provided with an injector 42 that directly injects fuel into the cylinder. The injector 42 for each cylinder is connected to a common rail (not shown). The common rail stores high-pressure fuel that is pressurized by a supply pump (not shown). Fuel is supplied from the common rail to the injector 42 for each cylinder.

A crank angle sensor 46 is installed near a crankshaft 44 of the diesel engine 10 to detect a rotation angle of the crankshaft 44. The ECU 50 can calculate the engine speed based on a signal of the crank angle sensor 46.

The diesel engine 10 also includes an exhaust VVT mechanism (exhaust variable valve timing mechanism) 58, which varies the valve timing of an exhaust valve 56. The exhaust VVT mechanism 58 according to the present embodiment can vary the phase of a camshaft driving the exhaust valve 56 to advance or retard the phase of a period during which the exhaust valve 56 is open. More specifically, the exhaust VVT mechanism 58 can continuously advance or retard the exhaust valve opening (EVO) timing and exhaust valve closing (EVC) timing without changing the valve-open period. The exhaust VVT mechanism 58 is connected to the ECU 50.

The exhaust variable valve timing mechanism according to the present invention is not limited to the exhaust VVT mechanism 58. More specifically, the exhaust variable valve timing mechanism according to the present invention may have any configuration as far as it can vary at least the opening timing of the exhaust valve 56 continuously or stepwise. For example, the following mechanisms may be used as the exhaust variable valve timing mechanism:

(1) An operating angle change mechanism for varying the opening timing and operating angle (valve-open period) of the exhaust valve 56 with a swing cam or the like positioned between the exhaust valve 56 and camshaft (2) A mechanism for opening/closing the exhaust valve 56 at a desired timing by operating an electric motor to rotationally drive a cam that opens the exhaust valve 56

(3) A mechanism (electromagnetically driven valve) for opening/closing the exhaust valve 56 at a desired timing by driving the exhaust valve 56 through the use of electromagnetic force The configuration shown in FIG. 2 indicates that the diesel engine 10 further includes an intake VVT mechanism (intake variable valve timing mechanism) 54 which varies the valve timing of an intake valve 52. In the present invention, however, the valve opening characteristics of the intake valve 52 may be fixed. More specifically, the present invention may use a normal valve train to drive the intake valve 52 without incorporating the intake VVT mechanism 54.

Features of First Embodiment (Supercharger Switching Control)

As is well known, turbochargers are driven by the exhaust energy of an internal combustion engine. The exhaust energy is a value that is determined by the amount, temperature, and pressure of exhaust gas. This value increases with an increase in the rotation speed and with an increase in the load. Therefore, an internal combustion engine with a turbocharger is generally likely to suffer, for instance, from torque insufficiency, fuel economy deterioration, and response degradation (so-called turbo lag) because a turbine does not effectively operate in a low-rotation-speed, low-load operating region where the exhaust energy is low.

On the other hand, the diesel engine 10 according to the present embodiment can obtain a high boost pressure in a wide operating region by mainly operating the small turbocharger 16 in a low-rotation-speed and low-load operating region where the exhaust energy is low and by mainly operating the large turbocharger 18 in a high-rotation-speed and high-load operating region where the exhaust energy is high.

In other words, the small turbocharger 16 has a smaller capacity than the large turbocharger 18 and therefore effectively operates even when the exhaust energy is low. In a low-exhaust-energy (low-rotation-speed and low-load) region, therefore, the small turbocharger 16 produces a higher boost pressure than the large turbocharger 18. In a high-exhaust-energy region, on the other hand, the boost pressure produced by the small turbocharger 16 is limited because its capacity is insufficient. Meanwhile, the large turbocharger 18 can handle high flow rates and therefore produces a higher boost pressure in a high-exhaust-energy region than the small turbocharger 16. Consequently, operating the small turbocharger 16 in a low-exhaust-energy region and the large turbocharger 18 in a high-exhaust-energy region makes it possible to properly provide supercharging in a wide region, thereby sufficiently improving torque, fuel economy, response, and other characteristics.

The following description assumes that a state where the small turbocharger 16 is mainly operated is referred to as the "small turbo operating state," and that a state where the large turbocharger 18 is mainly operated is referred to as the "large turbo operating state." The ECU 50 stores a map that predefines an operating region where the small turbo operating state should be selected and an operating region where the large turbo operating state should be selected. Further, the ECU 50 calculates the rotation speed and load of the diesel engine 10 from signals detected by the crank angle sensor 46 and accelerator position sensor 40, and exercises supercharger switching control to select either the small turbo operating state or large turbo operating state based on the map.

In the small turbo operating state, the open/close valve 22 installed in the small turbine bypass path 20 is closed. In this state, the exhaust gas from the exhaust manifold 12 flows into the turbine 16*a* for the small turbocharger 16 and operates the turbine 16*a*. The exhaust gas discharged from the turbine 16*a* then flows into the turbine 18*a* for the large turbocharger 18. This exhaust gas has a low energy because its energy is already recovered by the turbine 16*a* for the small turbocharger 16. Consequently, the small turbocharger 16 mainly operates as the large turbocharger 18 does not effectively operate.

In the large turbo operating state, on the other hand, the open/close valve 22 installed in the small turbine bypass path 20 is open. In this state, as the open/close valve 22 is open, the flow path of an exhaust gas inflow from the exhaust manifold 12 branches into the small turbine bypass path 20 and a path to the turbine 16*a* for the small turbocharger 16. However, most of the exhaust gas from the exhaust manifold 12 flows into the small turbine bypass path 20 which exhibits a low airflow resistance. Therefore, the turbine 16*a* for the small turbocharger 16 is substantially inoperative. The exhaust gas passing through the small turbine bypass path 20 and flowing into the exhaust path 17 then flows into the turbine 18*a* for the large turbocharger 18 to operate the turbine 18*a*. In this manner, the large turbocharger 18 mainly operates in the large turbo operating state.

(Charging Efficiency Enhancement Control)

Figure 3:
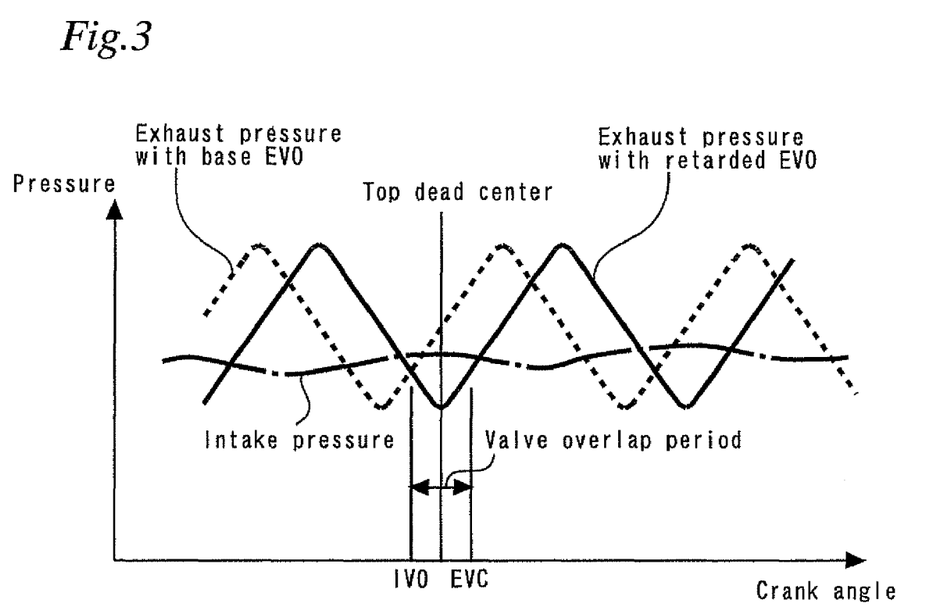
FIG. 3 is a diagram illustrating how charging efficiency enhancement control is exercised.

The system according to the present embodiment can provide charging efficiency enhancement control during a valve overlap period (vicinity of intake/exhaust top dead center) during which the valve-open periods of the exhaust valve 56 and intake valve 52 overlap. Charging efficiency enhancement control is exercised to enhance the charging efficiency $\eta_v$ of the diesel engine 10 by using a scavenging effect. FIG. 3 is a diagram illustrating how charging efficiency enhancement control is exercised.

Exhaust pressure (exhaust manifold pressure) pulsates (varies) as exhaust gas is intermittently discharged from the exhaust valve 56 for each cylinder. A waveform shown by the broken line in FIG. 3 represents the pulsation of exhaust pressure prevailing when the exhaust VVT mechanism 58 is controlled so that exhaust valve opening timing coincides with base timing. When control is exercised so that the exhaust valve opening timing coincides with the base timing as indicated by the above waveform, a trough of the exhaust pressure pulsation is advanced from the opening timing of the intake valve 52 (intake valve opening (IVO) timing).

A waveform shown by the solid line in FIG. 3, on the other hand, represents the pulsation of exhaust pressure prevailing when the exhaust VVT mechanism 58 is controlled so that the exhaust valve opening timing is retarded from the base timing. Retarding the exhaust valve opening timing retards the timing at which the exhaust gas is discharged to an exhaust port. Therefore, the waveform (phase) of the exhaust pressure shifts to the right as indicated in FIG. 3. Consequently, when the amount of retarding the exhaust valve opening timing is properly set, the timing of a trough of the exhaust pressure pulsation coincides with the valve overlap period. As described above, charging efficiency enhancement control is exercised to retard the exhaust valve opening timing from the base timing in such a manner that a trough of the exhaust pressure pulsation is present within the valve overlap period.

Meanwhile, the one-dot chain line in FIG. 3 represents intake pressure (intake manifold pressure). As indicated in FIG. 3, the intake pressure remains substantially constant irrespective of a crank angle. Therefore, when charging efficiency enhancement control is exercised in such a manner that a trough of the exhaust pressure pulsation is present within the valve overlap period, the intake pressure can be higher than the exhaust pressure during the valve overlap period. Consequently, when the intake valve 52 opens, fresh air flowing into a cylinder from the intake valve 52 quickly expels a burned gas in the cylinder to the exhaust port. As a high scavenging effect is produced in this manner, the burned gas in a cylinder can be replaced with fresh air smoothly and unfailingly. As a result, the amount of residual gas can be substantially reduced to increase the amount of fresh air introduced into a cylinder. In other words, the charging efficiency $\eta_v$ can be enhanced to increase the torque of the diesel engine 10.

When charging efficiency enhancement control is exercised as described above, the greater the difference between the intake pressure and exhaust pressure during the valve overlap period, the higher the produced scavenging effect and thus the higher the degree of charging efficiency enhancement (i.e., increment of air amount). Further, the difference between the intake pressure and exhaust pressure during the valve overlap period can be adjusted by varying the amount of retard of the exhaust valve opening timing from the base timing. Consequently, when charging efficiency enhancement control is exercised, the degree of charging efficiency enhancement (increment of air amount) can be increased or decreased by controlling the amount of retard of the exhaust valve opening timing.

In the small turbo operating state, the system according to the present embodiment can obtain a substantial effect of the above-described charging efficiency enhancement control. In the large turbo operating state, however, the system according to the present embodiment cannot obtain a substantial effect of the above-described charging efficiency enhancement control. The reason is described below.

The exhaust pressure pulsation increases its intensity when the total volume of the exhaust manifold 12 and the space communicating with the exhaust manifold 12 (hereinafter referred to as the "exhaust system volume") decreases. The reason is that when the exhaust system volume decreases, the exhaust manifold pressure prevailing upon the discharge of exhaust gas from the exhaust valve 56 increases, thereby causing the exhaust manifold pressure to decrease reactively during the latter half of an exhaust stroke. When, on the contrary, the exhaust system volume increases, the exhaust pressure pulsation decreases its intensity (decreases its amplitude).

In the small turbo operating state in which the open/close valve 22 is closed, no exhaust gas flows into the small turbine bypass path 20. Further, an exhaust pressure wave reflects from the inlet of the turbine 16a for the small turbocharger 16. Therefore, the exhaust system volume is decreased as it is terminated by the inlet of the turbine 16a for the small turbocharger 16. Thus, the amplitude of exhaust pressure pulsation is increased so that the exhaust pressure prevailing in a trough of pulsation is sufficiently low. This makes it possible to sufficiently increase the difference between the intake pressure and exhaust pressure during the valve overlap period. As a result, an adequately high scavenging effect is produced to substantially increase the charging efficiency and torque.

In the large turbo operating state, on the other hand, the open/close valve 22 opens so that the exhaust path 17 communicates with the exhaust manifold 12 through the small turbine bypass path 20. In this state, the exhaust pressure wave reflects from the inlet of the turbine 18a for the large turbocharger 18. Therefore, the exhaust system volume is terminated by the inlet of the turbine 18a for the large turbocharger 18. It means that the exhaust system volume is increased because the small turbine bypass path 20 and exhaust path 17 are added to the exhaust system volume. As a result, the amplitude of exhaust pressure pulsation decreases to prevent a decrease in the exhaust pressure prevailing in a trough of pulsation. This makes it extremely difficult to sufficiently increase the difference between the intake pressure and exhaust pressure during the valve overlap period. This results in the inability to produce an adequately high scavenging effect. Thus, the charging efficiency and torque cannot be substantially increased.

In a two-stage supercharging system according to the present embodiment, the boost pressure rise (increase gradient) by the large supercharger 18 after switching from the small turbo operating state to the large turbo operating state may vary with the operating status of the diesel engine 10. More specifically, when the rotation speed of the large turbocharger 18 is thoroughly increased before switching to the large turbo operating state, the boost pressure of the large turbocharger 18 quickly builds up after switching. When, on the other hand, the rotation speed of the large turbocharger 18 is not thoroughly increased before switching to the large turbo operating state, the boost pressure of the large turbocharger 18 slowly builds up after switching.

The present embodiment uses the large turbo rotation speed sensor 25 to detect the rotation speed of the large turbocharger 18, judges whether the rotation speed of the large turbocharger 18 is thoroughly increased before switching, and predicts, based on the judgment result, whether the boost pressure of the large turbocharger 18 will build up quickly or slowly.

In addition to the above method, the present embodiment can use another prediction method. When, for instance, any of the following conditions exists, the rotation speed of the large turbocharger 18 is thoroughly increased before switching from the small turbo operating state to the large turbo operating state. Therefore, the present embodiment can predict that the boost pressure of the large turbocharger 18 will build up quickly.

(1) The opening of the variable nozzle 18c of the large turbocharger 18 is small before switching. When the opening of the variable nozzle 18c is small, the flow velocity of exhaust gas blown into the turbine 18a is high. Therefore, it can be predicted that the rotation speed of the large turbocharger 18 will be thoroughly increased before switching.

(2) The diesel engine 10 is thoroughly warmed up. In this instance, the temperatures of the exhaust gas and exhaust system are sufficiently high. Thus, the exhaust energy flowing into the large turbocharger 18 is also high. It can therefore be predicted that the rotation speed of the large turbocharger 18 will be thoroughly increased before switching. It should be noted that the degree of warm-up of the diesel engine 10 can be determined from the cooling water temperature detected by the water temperature sensor 41.

(3) Re-acceleration is performed, that is, acceleration is resumed after a brief accelerator-off period subsequent to the last acceleration. When re-acceleration is performed, the rotation speed of the large turbocharger 18 which has been increased by the last acceleration, is still not decreased. Therefore, it can be predicted that the rotation speed will be sufficiently high.

(4) There is a small deviation between a target boost pressure and an actual boost pressure detected by the boost pressure sensor 39. In this instance, the exhaust energy is sufficiently high. Therefore, it can be predicted that the rotation speed of the large turbocharger 18 will be thoroughly increased before switching.

Meanwhile, when a condition contrary to any of the above conditions exists, the rotation speed of the large turbocharger 18 is not thoroughly increased before switching. In such an instance, it can be predicted that the boost pressure generated by the large turbocharger 18 will build up slowly after switching.

(When the Boost Pressure of the Large Turbocharger 18 Builds Up Quickly)

Figure 4:
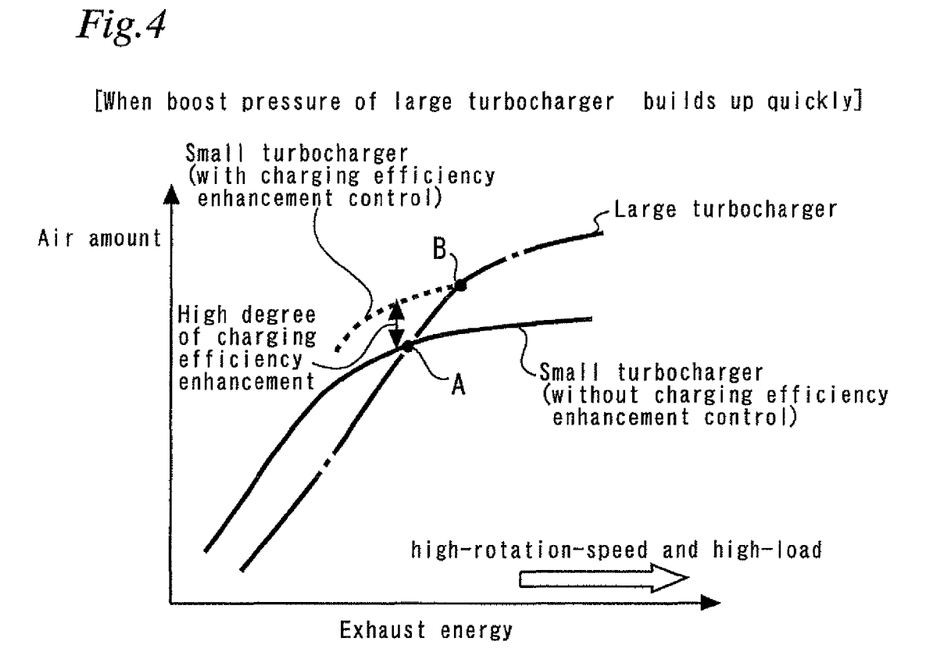
FIG. 4 is a diagram illustrating air amount characteristics of a small turbocharger and a large turbocharger.
Figure 5:
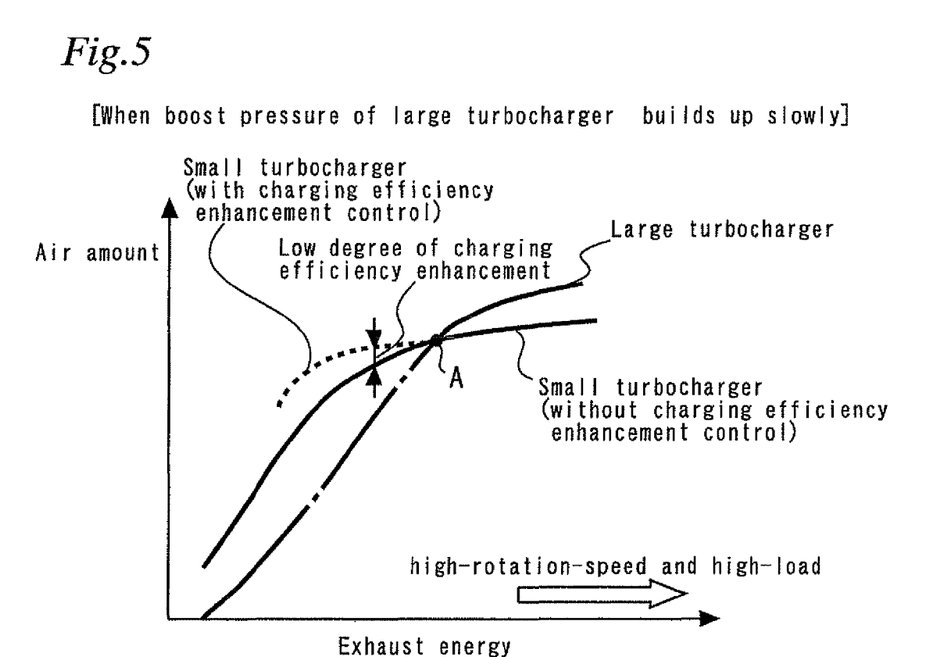
FIG. 5 is a diagram illustrating air amount characteristics of a small turbocharger and a large turbocharger.

FIG. 4 illustrates the air amount characteristics (supercharging characteristics) of the small turbocharger 16 and large turbocharger 18 that prevail when the boost pressure of the large turbocharger 18 builds up quickly (rapidly). The vertical axes of FIG. 4 and FIG. 5, which will be described later, represent the air amount (intake air amount). The higher the boost pressure, the larger the air amount. Therefore, even when the vertical axes of FIGS. 4 and 5 represent the boost pressure, the relationships depicted by the graphs exhibit the same tendency.

In FIG. 4, the solid line shows the air amount characteristics of the small turbocharger 16 that prevail when charging efficiency enhancement control is not exercised. The broken line shows the air amount characteristics of the small turbocharger 16 that prevail when charging efficiency enhancement control is exercised (to provide a high degree of charging efficiency enhancement). The one-dot chain line shows the air amount characteristics of the large turbocharger 18. For the reason mentioned earlier, the air amount characteristics of the large turbocharger 18 remain unchanged no matter whether charging efficiency enhancement control is exercised.

When supercharger switching control is exercised, the optimum point of switching between the small turbocharger 16 and large turbocharger 18 is a point at which the relationship between the air amount characteristics of these turbochargers is reversed. Therefore, when charging efficiency enhancement control is not provided, supercharger switching control is exercised to switch from the small turbo operating state to the large turbo operating state at point A in FIG. 4. In this instance, however, the gradient of air amount increase temporarily decreases near switching point A, as is obvious from FIG. 4. More specifically, the rate of air amount increase (boost pressure increase) by the small turbocharger 16 temporarily decreases before switching point A. After switching to the large turbocharger 18 at switching point A, the air amount (boost pressure) increases sharply again. Therefore, an abrupt torque change and acceleration delay occur near switching point A.

In view of the above circumstances, the present embodiment exercises charging efficiency enhancement control in such a manner as to provide a high degree of charging efficiency enhancement before switching to the large turbocharger 18 when it is predicted that the boost pressure of the large turbocharger 18 will build up quickly. When charging efficiency enhancement control is exercised to provide a high degree of charging efficiency enhancement, the air amount to be generated by the small turbocharger 16 can be greatly increased as indicated by the broken line in FIG. 4. In this instance, switching occurs from the small turbo operating state to the large turbo operating state at point B in FIG. 4. As is obvious from FIG. 4, this switching makes it possible to prevent the aforementioned temporary decrease in the gradient of air amount increase near switching point A. Consequently, when switching occurs from the small turbocharger 16 to the large turbocharger 18, an abrupt torque change and acceleration delay can be certainly avoided to assure good acceleration.

(When the Boost Pressure of the Large Turbocharger 18 Builds Up Slowly)

FIG. 5 illustrates the air amount characteristics of the small turbocharger 16 and large turbocharger 18 that prevail when the boost pressure of the large turbocharger 18 builds up slowly. In FIG. 5, the solid line shows the air amount characteristics of the small turbocharger 16 that prevail when charging efficiency enhancement control is not exercised. The broken line shows the air amount characteristics of the small turbocharger 16 that prevail when charging efficiency enhancement control is exercised (to provide a low degree of charging efficiency enhancement). The one-dot chain line shows the air amount characteristics of the large turbocharger 18.

Point A in FIG. 5 is the optimum point of switching between the small turbocharger 16 and large turbocharger 18 when charging efficiency enhancement control is not exercised, as is the case with point A in FIG. 4. When the boost pressure generated by the large turbocharger 18 builds up slowly, the gradient of air amount increase (boost pressure increase) is low after switching to the large turbocharger 18 at switching point A. It means that the air amount increase smoothly continues in spite of switching point A. Consequently, no abrupt torque change occurs.

Conversely, if charging efficiency enhancement control is exercised to provide a high degree of charging efficiency enhancement, the air amount (boost pressure) decreases upon switching to the large turbocharger 18. In this instance, an abrupt torque change is likely to occur.

In view of the above circumstances, the present embodiment exercises charging efficiency enhancement control in such a manner as to provide a low degree of charging efficiency enhancement before switching to the large turbocharger 18 when it is predicted that the boost pressure of the large turbocharger 18 will build up slowly. This makes it possible to avoid an abrupt air amount change at the time of switching to the large turbocharger 18, as indicated by the broken line in FIG. 5. Consequently, the occurrence of an abrupt torque change can be surely prevented to assure good acceleration.

Details of Process Performed by First Embodiment

Figure 6:
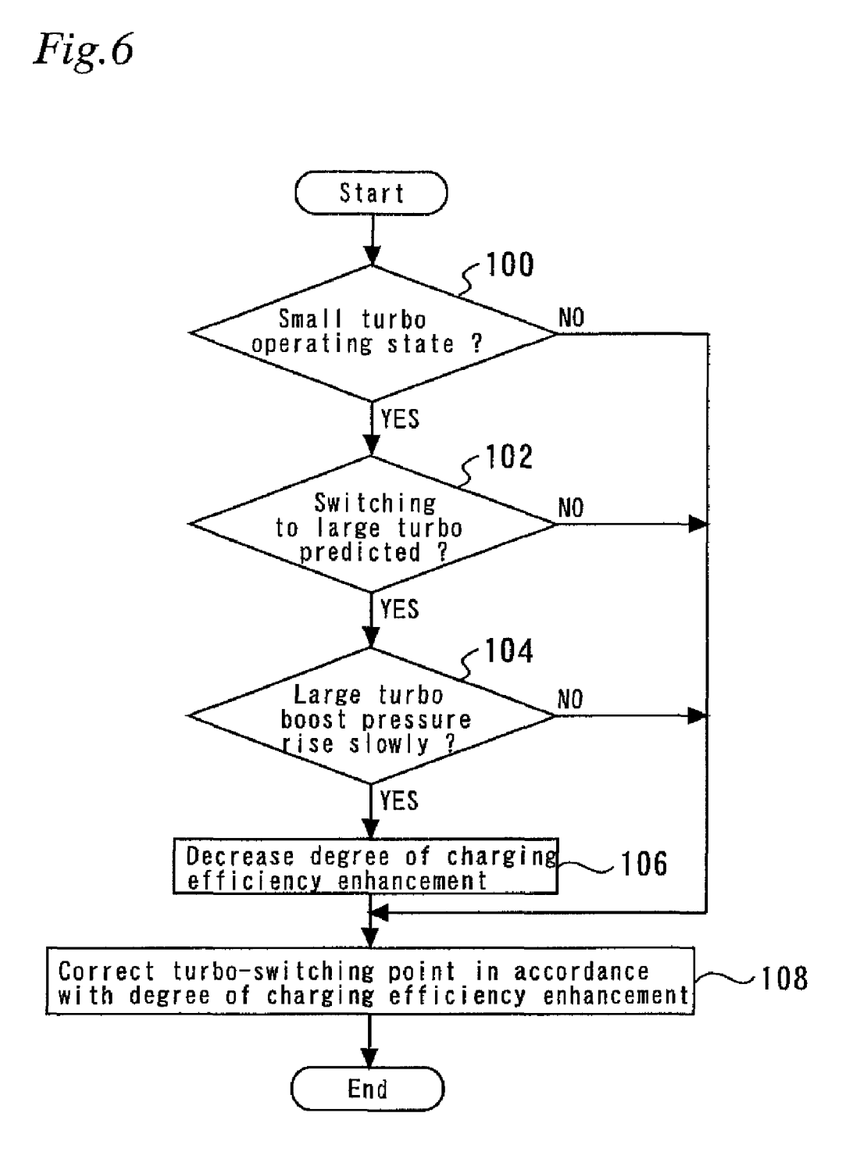
FIG. 6 is a flowchart illustrating a routine that is executed by the first embodiment of the present invention.

FIG. 6 is a flowchart illustrating a routine that the ECU 50 executes in the present embodiment to implement the above-described functionality. First of all, the routine shown in FIG. 6 performs step 100 to judge whether the small turbo operating state prevails. In step 100, the routine concludes that the small turbo operating state prevails when the open/close valve 22 which opens and closes the small turbine bypass path 20 is closed, and concludes that the small turbo operating state does not prevail when the open/close valve 22 is open.

When the judgment result obtained in step 100 indicates that the small turbo operating state prevails, the routine proceeds to step 102 and judges whether it is predicted that switching to the large turbocharger 18 will take place. Step 102 is performed, for instance, to predict, based on an accelerator pedal depression amount detected by the accelerator position sensor 40 or the speed of accelerator pedal depression, whether switching to the large turbocharger 18 will take place within a short period of time. More specifically, when a predetermined judgment value is exceeded by the accelerator pedal depression amount or speed, the routine predicts that switching to the large turbocharger 18 will occur within a short period of time.

When it is predicted in step 102 that switching to the large turbocharger 18 will occur, the routine proceeds to step 104 and predicts whether the boost pressure generated by the large turbocharger 18 will build up quickly or slowly. In step 104, one of the following methods is used to predict whether the large turbocharger 18 will build up its boost pressure quickly or slowly.

(1) When the opening of the variable nozzle 18c of the large turbocharger 18 is greater than a predetermined judgment value, it is predicted that the boost pressure of the large turbocharger 18 will build up slowly. When, on the other hand, the opening of the variable nozzle 18c of the large turbocharger 18 is smaller than the predetermined judgment value, it is predicted that the boost pressure of the large turbocharger 18 will build up quickly.

(2) When the degree of warm-up of the diesel engine 10, which is detected by the water temperature sensor 41, is lower than a predetermined judgment value, it is predicted that the boost pressure of the large turbocharger 18 will build up slowly. When, on the other hand, the degree of warm-up of the diesel engine 10 is higher than the predetermined judgment value, it is predicted that the boost pressure of the large turbocharger 18 will build up quickly.

(3) When currently performed acceleration is not re-acceleration, it is predicted that the boost pressure of the large turbocharger 18 will build up slowly. When, on the other hand, the currently performed acceleration is re-acceleration, it is predicted that the boost pressure of the large turbocharger 18 will build up quickly.

(4) When the deviation between a target boost pressure and an actual boost pressure is greater than a predetermined judgment value (target boost pressure >actual boost pressure), it is predicted that the boost pressure of the large turbocharger 18 will build up slowly. When, on the other hand, the deviation between the target boost pressure and the actual boost pressure is smaller than the predetermined judgment value, it is predicted that the boost pressure of the large turbocharger 18 will build up quickly.

(5) When the rotation speed of the large turbocharger 18, which is detected by the large turbo rotation speed sensor 25, is lower than a predetermined judgment value, it is predicted that the boost pressure of the large turbocharger 18 will build up slowly. When, on the other hand, the rotation speed of the large turbocharger 18 is higher than the predetermined judgment value, it is predicted that the boost pressure of the large turbocharger 18 will build up quickly.

The present embodiment assumes that a great base value (initial value) is preselected to represent the degree of charging efficiency enhancement for charging efficiency enhancement control. When it is predicted in step 104 that the boost pressure of the large turbocharger 18 will build up slowly, the routine proceeds to step 106 and performs a process for decreasing the degree of charging efficiency enhancement for charging efficiency enhancement control. More specifically, step 106 is performed to decrease the amount of retard of exhaust valve opening timing. This reduces the difference between the intake pressure and exhaust pressure during the valve overlap period.

Upon completion of step 106, the routine proceeds to step 108 and performs a process for correcting the point of switching from the small turbo operating state to the large turbo operating state in accordance with the degree of charging efficiency enhancement for charging efficiency enhancement control. As is obvious from FIG. 4, the optimum point of switching from the small turbo operating state to the large turbo operating state varies with the degree of charging efficiency enhancement. More specifically, when the degree of charging efficiency enhancement increases, the optimum point of switching shifts toward a higher-rotation-speed and higher-load side. In view of the above circumstances, step 108 is performed, when the degree of charging efficiency enhancement is high, to correct the switching point so that the switching point is on a higher-rotation-speed and higher-load side than when the degree of charging efficiency enhancement is low.

As a result of the process performed by the routine described above with reference to FIG. 6, the air amount characteristics prevailing before switching to the large turbocharger 18 are as shown by the broken line in FIG. 4 when it is predicted that the boost pressure of the large turbocharger 18 will build up quickly. Further, the air amount characteristics prevailing before switching to the large turbocharger 18 are as shown by the broken line in FIG. 5 when it is predicted that the boost pressure of the large turbocharger 18 will build up slowly. This make it possible to surely avoid an abrupt change in the air amount (boost pressure) at the time of switching no matter whether the boost pressure of the large turbocharger 18 builds up slowly or quickly. Consequently, the torque can be smoothly increased to provide good drivability.

In step 104, the routine described above with reference to FIG. 6 predicts whether the boost pressure of the large turbocharger 18 will build up either slowly or quickly. Alternatively, however, the present invention may predict the rate of boost pressure build-up in a stepwise or continuous manner, and correct the degree of charging efficiency enhancement in a stepwise or continuous manner based on the prediction result.

The foregoing description assumes that the present embodiment is applied to the control of a diesel engine (compression ignition internal combustion engine). However, the present invention is applicable not only to the control of a diesel engine but also to the control of a spark ignition internal combustion engine.

The foregoing description also assumes that the present embodiment is applied to a system where the exhaust gas flows into the turbine 18a for the large turbocharger 18 even in the small turbo operating state. However, the present invention may include a large turbine bypass path for bypassing the turbine 18a for the large turbocharger 18 and an open/close valve for opening and closing the large turbine bypass path, and allow the exhaust gas to flow into the large turbine bypass path, instead of into the turbine 18a for the large turbocharger 18, in the small turbo operating state.

The foregoing description also assumes that the present embodiment is applied to a case where a turbocharger is used as the supercharger. However, the present invention is also applicable to a case where a mechanical supercharger driven by an output shaft of an internal combustion engine is used. In a case where the employed system includes a small supercharger and a large supercharger, as is the case with the system according to the present embodiment, one of these superchargers may be a mechanical supercharger with the other being a turbocharger or each of them may be a mechanical supercharger.

The foregoing description also assumes that the present embodiment is applied to a system that includes a small supercharger and a large supercharger. However, the present invention is also applicable to a system that includes only one supercharger, refrains from using the supercharger when the operating point of an internal combustion engine is a relatively low-rotation-speed and low-load side, and uses the supercharger when the operating point is a high-rotation-speed and high-load side.

In the present embodiment, the small turbocharger 16 corresponds to the "small supercharger" according to the second aspect of the present invention; the large turbocharger 18 corresponds to the "supercharger" according to the first aspect and to the "large supercharger" according to the second aspect; the small turbo operating state corresponds to the "supercharger nonoperating state" according to the first aspect and to the "small supercharger operating state" according to the second aspect; the large turbo operating state corresponds to the "supercharger operating state" according to the first aspect and to the "large supercharger operating state" according to the second aspect; the large turbo rotation speed sensor 25 or boost pressure sensor 39 corresponds to the "detection means" according to the fourth aspect; and the water temperature sensor 41 corresponds to the "degree-of-warm-up detection means" according to the fifth aspect. The "supercharger switching means" according to the first and second aspects of the present invention is implemented when the ECU 50 controls the open/close valve 22 to switch between the small turbo operating state and large turbo operating state; the "charging efficiency enhancement means" according to the first and second aspects is implemented when the ECU 50 controls the exhaust VVT mechanism 58 (and, if necessary, the intake VVT mechanism 54 as well) to cause scavenging during the valve overlap period; the "boost pressure prediction means" according to the first and second aspects is implemented when the ECU 50 performs step 104; the "degree-of-charging-efficiency-enhancement control means" according to the first and second aspects is implemented when the ECU 50 performs step 106; and the "switching point correction means" according to the sixth aspect is implemented when the ECU 50 performs step 108.

The invention claimed is:
1. A control apparatus for an internal combustion engine, the control apparatus comprising:
a supercharger;
supercharger switching means for switching the supercharger between a supercharger nonoperating state and a supercharger operating state, the nonoperating state making the supercharger substantially inoperative when an operating point of the internal combustion engine is within a low-rotation-speed and low-load region, the operating state making the supercharger operative when the operating point is within a high-rotation-speed and high-load region;
charging efficiency enhancement means for exercising charging efficiency enhancement control in the supercharger nonoperating state, wherein a valve overlap period is provided during which an intake valve open period and an exhaust valve open period overlap and a trough of exhaust pressure pulsation is adjusted to be present within the valve overlap period;
boost pressure prediction means for preliminarily predicting, before switching from the supercharger nonoperating state to the supercharger operating state, whether the supercharger will build up boost pressure quickly or slowly depending on the rotation speed of the supercharger; and
degree-of-charging-efficiency-enhancement control means which, when the boost pressure is predicted to build up slowly, causes the charging efficiency enhancement means to provide a lower degree of charging efficiency enhancement than when the boost pressure is predicted to build up quickly.

2. The control apparatus according to claim 1, further comprising degree-of-warm-up detection means for detecting the degree of warm-up of the internal combustion engine,
wherein the boost pressure prediction means predicts, based on the degree of warm-up, whether the boost pressure will build up quickly or slowly.

3. The control apparatus according to claim 1, further comprising switching point correction means which, when the degree of charging efficiency enhancement is high, set a switching point of the supercharger switching means on a higher-rotation-speed and higher-load side than when the degree of charging efficiency enhancement is low.

4. A control apparatus for an internal combustion engine, the control apparatus comprising:
a small supercharger;
a large supercharger having a larger capacity than the small supercharger;
supercharger switching means for switching these superchargers between a small supercharger operating state and a large supercharger operating state, the small supercharger operating state making the small supercharger mainly operative when an operating point of the internal combustion engine is within a low-rotation-speed and low-load region, the large supercharger operating state making the large supercharger mainly operative when the operating point is within a high-rotation-speed and high-load region;
charging efficiency enhancement means for exercising charging efficiency enhancement control in the small supercharger operating state, wherein a valve overlap period is provided during which an intake valve open period and an exhaust valve open period overlap and a trough of exhaust pressure pulsation is adjusted to be present within the valve overlap period;
boost pressure prediction means for preliminarily predicting, before switching from the small supercharger operating state to the large supercharger operating state, whether the large supercharger will build up boost pressure quickly or slowly depending on the rotation speed of the large supercharger; and
degree-of-charging-efficiency-enhancement control means which, when the boost pressure is predicted to build up slowly, causes the charging efficiency enhancement means to provide a lower degree of charging efficiency enhancement than when the boost pressure is predicted to build up quickly.

5. The control apparatus according to claim 4, wherein the large supercharger includes a turbine which operates on exhaust gas, and a variable nozzle which varies the inlet area of the turbine, and
wherein the boost pressure prediction means predicts, based on the opening of the variable nozzle, whether the boost pressure will build up quickly or slowly.

6. The control apparatus according to claim 4, further comprising detection means for detecting the boost pressure or the rotation speed of the large supercharger,
wherein the boost pressure prediction means predicts, based on the detected boost pressure or rotation speed, whether the boost pressure will build up quickly or slowly.

7. The control apparatus according to claim 4, further comprising degree-of-warm-up detection means for detecting the degree of warm-up of the internal combustion engine,
wherein the boost pressure prediction means predicts, based on the degree of warm-up, whether the boost pressure will build up quickly or slowly.

8. The control apparatus according to claim 4, further comprising switching point correction means which, when the degree of charging efficiency enhancement is high, set a switching point of the supercharger switching means on a higher-rotation-speed and higher-load side than when the degree of charging efficiency enhancement is low.

9. A control apparatus for an internal combustion engine, the control apparatus comprising:
- a supercharger;
- a supercharger switching device for switching the supercharger between a supercharger nonoperating state and a supercharger operating state, the nonoperating state making the supercharger substantially inoperative when an operating point of the internal combustion engine is within a low-rotation-speed and low-load region, the operating state making the supercharger operative when the operating point is within a high-rotation-speed and high-load region;
- a charging efficiency enhancement device for exercising charging efficiency enhancement control in the supercharger nonoperating state, wherein a valve overlap period is provided during which an intake valve open period and an exhaust valve open period overlap and a trough of exhaust pressure pulsation is adjusted to be present within the valve overlap period;
- a boost pressure prediction device for preliminarily predicting, before switching from the supercharger nonoperating state to the supercharger operating state, whether the supercharger will build up boost pressure quickly or slowly depending on the rotation speed of the supercharger; and
- a degree-of-charging-efficiency-enhancement control device which, when the boost pressure is predicted to build up slowly, causes the charging efficiency enhancement device to provide a lower degree of charging efficiency enhancement than when the boost pressure is predicted to build up quickly.

10. The control apparatus according to claim 9, further comprising a degree-of-warm-up detection device for detecting the degree of warm-up of the internal combustion engine,
wherein the boost pressure prediction device predicts, based on the degree of warm-up, whether the boost pressure will build up quickly or slowly.

11. The control apparatus according to claim 9, further comprising a switching point correction device which, when the degree of charging efficiency enhancement is high, set a switching point of the supercharger switching device on a higher-rotation-speed and higher-load side than when the degree of charging efficiency enhancement is low.

12. A control apparatus for an internal combustion engine, the control apparatus comprising:
- a small supercharger;
- a large supercharger having a larger capacity than the small supercharger;
- a supercharger switching device for switching these superchargers between a small supercharger operating state and a large supercharger operating state, the small supercharger operating state making the small supercharger mainly operative when an operating point of the internal combustion engine is within a low-rotation-speed and low-load region, the large supercharger operating state making the large supercharger mainly operative when the operating point is within a high-rotation-speed and high-load region;
- a charging efficiency enhancement device for exercising charging efficiency enhancement control in the small supercharger operating state, wherein a valve overlap period is provided during which an intake valve open period and an exhaust valve open period overlap and a trough of exhaust pressure pulsation is adjusted to be present within the valve overlap period;
- a boost pressure prediction device for preliminarily predicting, before switching from the small supercharger operating state to the large supercharger operating state, whether the large supercharger will build up boost pressure quickly or slowly depending on the rotation speed of the large supercharger; and
- a degree-of-charging-efficiency-enhancement control device which, when the boost pressure is predicted to build up slowly, causes the charging efficiency enhancement device to provide a lower degree of charging efficiency enhancement than when the boost pressure is predicted to build up quickly.

13. The control apparatus according to claim 12, wherein the large supercharger includes a turbine which operates on exhaust gas, and a variable nozzle which varies the inlet area of the turbine, and
wherein the boost pressure prediction device predicts, based on the opening of the variable nozzle, whether the boost pressure will build up quickly or slowly.

14. The control apparatus according to claim 12, further comprising a detection device for detecting the boost pressure or the rotation speed of the large supercharger,
wherein the boost pressure prediction device predicts, based on the detected boost pressure or rotation speed, whether the boost pressure will build up quickly or slowly.

15. The control apparatus according to claim 12, further comprising a degree-of-warm-up detection device for detecting the degree of warm-up of the internal combustion engine,
wherein the boost pressure prediction device predicts, based on the degree of warm-up, whether the boost pressure will build up quickly or slowly.

16. The control apparatus according to claim 12, further comprising a switching point correction device which, when the degree of charging efficiency enhancement is high, set a switching point of the supercharger switching device on a higher-rotation-speed and higher-load side than when the degree of charging efficiency enhancement is low.

\* \* \* \* \*